United States Patent [19]
Annecharico et al.

[11] Patent Number: 5,549,078
[45] Date of Patent: Aug. 27, 1996

[54] DEVICE FOR SUPERHEATING STEAM

[76] Inventors: Robert L. Annecharico; Norman Campbell, both of 25 Indian Dr., Clinton, Conn. 06413

[21] Appl. No.: 342,620

[22] Filed: Nov. 21, 1994

[51] Int. Cl.[6] ........................................... F22B 5/00
[52] U.S. Cl. ..................... 122/132; 122/4 R; 122/4 A; 122/13.1; 122/32; 392/397; 392/398; 392/485; 392/488
[58] Field of Search ..................... 122/4 R, 4 A, 122/13.1, 13.2, 32; 392/397, 398, 485, 488

[56] References Cited

U.S. PATENT DOCUMENTS 2,467,393  4/1949  Leher ........................................ 219/39

FOREIGN PATENT DOCUMENTS 2260749  9/1975  France .
4410570  6/1995  Germany .

*Primary Examiner*—Henry A. Bennett
*Assistant Examiner*—Siddharth Ohri

[57] ABSTRACT

The present invention relates to a heating device for submersion within a tank of water to boil the water to produce steam, and for superheating the steam, comprising an outer sleeve; an inner sleeve partially disposed through the outer sleeve and having a proximal end, and a distal end in the form of an outlet port, the inner sleeve further defining a vapor chamber; a heating element disposed within the vapor chamber and in electrical communication with an external electrical power supply, the heating element adapted to produce heat in response to electrical energy from the power supply; a steam inlet tube extending outwardly from the inner tube and in fluid communication with the vapor chamber; and a one way valve disposed within the vapor chamber adjacent the outlet port, the valve adapted to selectively gate the flow of vapor from within the vapor chamber through the outlet port; wherein the heating device is configured to heat the water within the tank to a boil to produce steam, the steam inlet tube adapted to direct the steam into the vapor chamber wherein the steam is superheated through direct contact with the heating element producing vapor, the vapor generating sufficient pressure to open the valve and exit the heating device through the outlet port.

10 Claims, 3 Drawing Sheets

DEVICE FOR SUPERHEATING STEAM

BACKGROUND OF THE INVENTION

1. Field of the Invention

The present invention relates to water purification systems. More particularly, the present invention relates to a steam superheating device which vaporizes water into steam, then super heats the steam.

2. Description of the Prior Art

Many techniques have been employed for the treatment of impure water so as to provide a potable water supply. Generally the most widely employed techniques utilize distillation of one form or another, with wide variations in the source of heat energy being employed. Typically, heat energy is applied to the water by a first heating device which vaporizes the steam. In addition to vaporizing the water into steam, it has been known in the prior art to employ a second heating device to superheat the steam produced by the first heating device. An example of such a water purification apparatus is disclosed in U.S. Pat. No. 4,045,293 to Cooksley.

Cooksley discloses a water purification apparatus capable of treating water having impurities producing substantial foaming includes a boiler tank having a water inlet and a first heater for boiling the water within the water tank. A stack portion above the tank contains contact surfaces. A second heater is provided for heating the contact surfaces to a temperature above the vaporization temperature of water. In this manner water droplets which may be carried by the steam vapors from the boiler and/or foam will be immediately vaporized as it comes in contact with the contact surfaces. The steam vapors pass through a condenser assembly, and the condensate passes through a filter assembly before storage in a tank. The contact surfaces desirably comprises screen members providing a tortuous path and high heat conductivity. Baffle members may be interposed in the flow path for vapors from the boiler tank to the stack. Valves and a control circuit are desirably included to automatically control the volume of water in the boiler, to cut off water flow to components and to drain the assembly upon shutdown.

One of the major impediments to use of distillation involving rapid boiling of the water is the tendency for foaming to occur with certain types of contamination. This foaming often will require excessively large dimensions for the boiler or an intricate and elongated passage from the boiler to the condenser. Moreover, even with water feedstocks which do not evidence substantial foaming, rapid boiling will frequently produce a tendency for water droplets which are carded by the steam vapors into the condenser. As will be readily appreciated, foam droplets or such water droplets will exhibit the contamination of the feedstock and thereby contaminate the condensate which is produced.

In an attempt to eliminate the contamination posed by the feedstock, the prior an devices have employed a second superheating heater as described in Cooksley. However, one of the disadvantages in such a system as described above, is the requirement of two heating elements, one for boiling water to produce steam, and another for superheating the steam to vaporize the suspended water droplets in the steam. Dual heating elements accordingly require additional space, electrical connections, conduits, etc., adding to the complexity and cost of the water purification system.

Another problem which is frequently encountered in certain sections of the world involves the contamination of the water supply by organic compounds which vaporize along with the water in the boiler. Exemplary of such contaminants are carbon tetrachloride and chloroform which result from chlorination of water supplies containing dissolved methane and other hydrocarbons.

Various types of water purification devices have been suggested for providing potable water in the home, or on shipboard, or in other locations. Many of these devices require substantially continuous operation for efficiency, others require substantial investments, and still others require extensive maintenance from time to time.

It is an object of the present invention to provide a heating device for use in a water purification apparatus which can both boiler water to produce steam, and which can superheat the steam.

It is also an object to provide such a device which may be simply and ruggedly constructed to provide a durable and readily serviceable unit.

Another object is to provide such a device which is capable of substantially eliminating dissolved gaseous contaminants from water feedstock.

A further object is to provide a device whereby water feedstock containing impurities may be rapidly and efficiently vaporized without carry-over contamination in the vapor.

Numerous innovations for heating devices have been provided in the prior art that are adapted to be used. Even though these innovations may be suitable for the specific individual purposes to which they address, they would not be suitable for the purposes of the present invention as heretofore described.

SUMMARY OF THE INVENTION

The present invention includes a heating device for submersion within a tank of water to boil the water to produce steam, and for superheating the steam, comprising an outer sleeve; an inner sleeve partially disposed through the outer sleeve and having a proximal end, and a distal end in the form of an outlet port, the inner sleeve further defining a vapor chamber; a heating element disposed within the vapor chamber and in electrical communication with an external electrical power supply, the heating element adapted to produce heat in response to electrical energy from the power supply; a steam inlet tube extending outwardly from the inner tube and in fluid communication with the vapor chamber; and a one way valve disposed within the vapor chamber adjacent the outlet port, the valve adapted to selectively gate the flow of vapor from within the vapor chamber through the outlet port; wherein the heating device is configured to heat the water within the tank to a boil to produce steam, the steam inlet tube adapted to direct the steam into the vapor chamber wherein the steam is superheated through direct contact with the heating element producing vapor, the vapor generating sufficient pressure to open the valve and exit the heating device through the outlet port into a length of tubing also being submerged within the feed stock acting as a heat exchanger cooling the super heated steam inside of the tubing and adding to the boiling action of the feeding stock in the tank improving efficiency.

In addition, the raw water inlet faces the top side of the screen baffle for the purpose of cleansing the screen baffle of debris when releasing new raw water into chamber.

The novel features which are considered characteristic for the invention are set forth in the appended claims. The invention itself, however, both as to its consreaction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—heating device 10
12—outer sleeve 12
14—inner sleeve 14
14A—inner sleeve vapor chamber 14A
14B—inner sleeve vapor exiting passage 14B
14C—inner sleeve outlet port 14C
16—heating element 16
1A6—heating element high temperature portion 16A
16B—heating element fining 16B
18—thermocouple 18
20—insulation 20
22—one way valve 22
24—tension spring 24
26—steam inlet tube 26
28—coil 28
50—tank 50
52—superheated steam conduit 52
54—baffle plate 54
56—power supply 56
80—water purification system 80
99—contaminated water 99
99A—purified water 99A

DETAILED LIST OF REFERENCE NUMERALS UTILIZED IN THE DRAWING

10—heating device 10 for submersion within a tank of water to boil the water to produce steam, and for superheating the steam, comprising an outer sleeve 12; an inner sleeve 14 partially disposed through the outer sleeve 12 having a proximal end, and a distal end in the form of an outlet port 14C, the inner sleeve 14 further defining a vapor chamber 14A; a heating element 16 disposed within the vapor chamber 14A and in electrical communication with an external electrical power supply, the heating element 16 adapted to produce heat in response to electrical energy from the power supply; a steam inlet tube 26 extending outwardly from the inner tube 14 and in fluid communication with the vapor chamber 14A; and a one way valve 22 disposed within the vapor chamber 14A adjacent the outlet port 14C, the valve 22 adapted to selectively gate the flow of vapor from within the vapor chamber 14A through the outlet port 14C; wherein the heating device 10 is configured to heat the water within the tank to boil to produce steam, the steam inlet tube 26 adapted to direct the steam into the vapor chamber 14A wherein the steam is superheated through direct contact with the heating element 16 producing vapor, the vapor generating sufficient pressure to open the valve 22 and exit the heating device 10 through the outlet port 14C.

12—outer sleeve 12 having a bore therethrough dimensioned to receive a portion of the inner sleeve 14 therethrough, functioning to conduct heat;

14—inner sleeve 14 partially disposed within the outer sleeve 12 and defining the vapor chamber 14A, an internal vapor exiting passage 14B, and the outlet port 14C, the inner sleeve 14 adapted to conduct heat;

14A—inner sleeve vapor chamber 14A defined by the inner sleeve 14 and extending from the proximal end of the inner sleeve 14 to the distal end of the inner sleeve 14;

14B—inner sleeve vapor exiting passage 14B formed proximal to the valve 22 serving to channel vapor into the valve 22;

14C—inner sleeve outlet port 14C formed at the distal end of the inner sleeve 14 and adapted for coupling to an external superheated steam conduit;

6—heating element 16 disposed within the vapor chamber 14A and in electrical communication with the external power supply through cables, the heating element 16 having a heating element high temperature portion 16A within the portion of the inner sleeve 14 that is contained with the outer sleeve 12, the heating element further forming a heating element fining 16B for connection to the cables, the heating element adapted to produce heat in response to electrical energy from the power supply;

16A—heating element high temperature portion 16A contained within the portion of the inner sleeve 14 that is contained with the outer sleeve 12;

16B—heating element fitting 16B adapted for coupling with the cables from the power supply;

18—thermocouple 18 connected to the heating element high temperature portion 16A and in electrical communication with an external control assembly, functioning to sense the temperature of the heating element high temperature portion 16A;

20—insulation 20 disposed between the outer sleeve 12 and the inner sleeve 14, functioning to insulate the heating device 10;

22—one way valve 22 disposed within the vapor chamber 14A between the vapor exiting passage 14B and the outlet port 14C, functioning to selectively gate vapor out of the outlet port 14C;

24—tension spring 24 attached to the valve 22 functioning to bias the valve into a closed position;

26—steam inlet tube 26 extending outwardly from the inner tube 14 and in fluid communication with the vapor chamber 14A, functioning to direct stem into the vapor chamber 14A;

28—coil 28 circumferentially disposed around the heating element high temperature portion 16A, functioning to provide a path for water flow;

50—tank 50 containing a volume of water 99 therein;

52—superheated steam conduit 52 in communication with the outlet port 14C to direct the superheated steam to an external condenser assembly;

54—baffle plate 54 disposed within the tank 50 above the water 90, functioning to provide a surface in which suspended water droplets and contaminants can be screened from the steam;

56—power supply 56 in electrical communication with the heating device 10 and the thermocouple 18;

80—water purification system 80;

99—contaminated water 99 contained within the water tank 50; and 99A purified water 99A.

BRIEF DESCRIPTION OF THE PREFERRED EMBODIMENT

DETAILED DESCRIPTION OF THE PREFERRED EMBODIMENT

Figure 1:
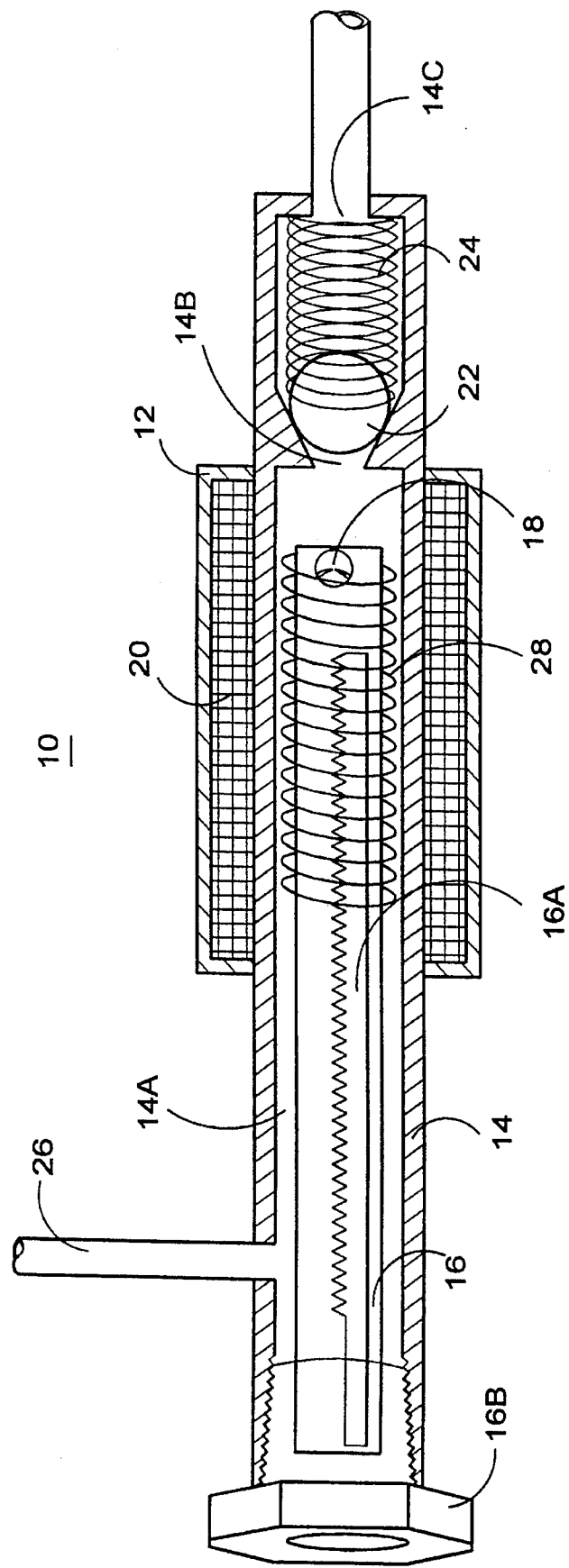
FIG. 1 is an elevational perspective view of a heating device constructed in accordance with a preferred embodiment of the present invention.

Firstly, referring to FIG. 1 which illustrates the present invention exhibiting the following features: heating device 10 for submersion within a tank of water to boil the water to produce steam, and for superheating the steam, comprising an outer sleeve 12; an inner sleeve 14 partially disposed through the outer sleeve 12 having a proximal end, and a distal end in the form of an outlet port 14C, the inner sleeve 14 further defining a vapor chamber 14A; a heating element 16 disposed within the vapor chamber 14A and in electrical communication with an external electrical power supply, the heating element 16 adapted to produce heat in response to electrical energy from the power supply; a steam inlet tube 26 extending outwardly from the inner tube 14 and in fluid communication with the vapor chamber 14A; and a one way valve 22 disposed within the vapor chamber 14A adjacent the outlet port 14C, the valve 22 adapted to selectively gate the flow of vapor from within the vapor chamber 14A through the outlet port 14C; wherein the heating device 10 is configured to heat the water within the tank to a boil to produce steam, the steam inlet tube 26 adapted to direct the steam into the vapor chamber 14A wherein the steam is superheated through direct contact with the heating element 16 producing vapor, the vapor generating sufficient pressure to open the vane 22 and exit the heating device 10 through the outlet port 14C; outer sleeve 12 having a bore therethrough dimensioned to receive a portion of the inner sleeve 14 therethrough, functioning to conduct heat; inner sleeve 14 partially disposed within the outer sleeve 12 and defining the vapor chamber 14A, an internal vapor exiting passage 14B, and the outlet port 14C, the inner sleeve 14 adapted to conduct heat; inner sleeve vapor chamber 14A defined by the inner sleeve 14 and extending from the proximal end of the inner sleeve 14 to the distal end of the inner sleeve 14; inner sleeve vapor exiting passage 14B formed proximal to the valve 22 serving to channel vapor into the valve 22; inner sleeve outlet port 14C formed at the distal end of the inner sleeve 14 and adapted for coupling to an external superheated steam conduit; heating element 16 disposed within the vapor chamber 14A and in electrical communication with the external power supply through cables, the heating element 16 having a heating element high temperature portion 16A within the portion of the inner sleeve 14 that is contained with the outer sleeve 12, the heating element further forming a heating element fitting 16B for connection to the cables, the heating element adapted to produce heat in response to electrical energy from the power supply; heating element high temperature portion 16A contained within the portion of the inner sleeve 14 that is contained with the outer sleeve 12; heating element fitting 16B adapted for coupling with the cables from the power supply; thermocouple 18 connected to the heating element high temperature portion 16A and in electrical communication with an external control assembly, functioning to sense the temperature of the heating element high temperature portion 16A; insulation 20 disposed between the outer sleeve 12 and the inner sleeve 14, functioning to insulate the heating device 10; one way valve 22 disposed within the vapor chamber 14A between the vapor exiting passage 14B and the outlet port 14C, functioning to selectively gate vapor out of the outlet port 14C; tension spring 24 attached to the valve 22 functioning to bias the valve into a closed position; steam inlet tube 26 extending outwardly from the inner tube 14 and in fluid communication with the vapor chamber 14A, functioning to direct steam into the vapor chamber 14A; and coil 28 circumferentially disposed around the heating element high temperature portion 16A, functioning to provide a path for water flow.

Figure 2:
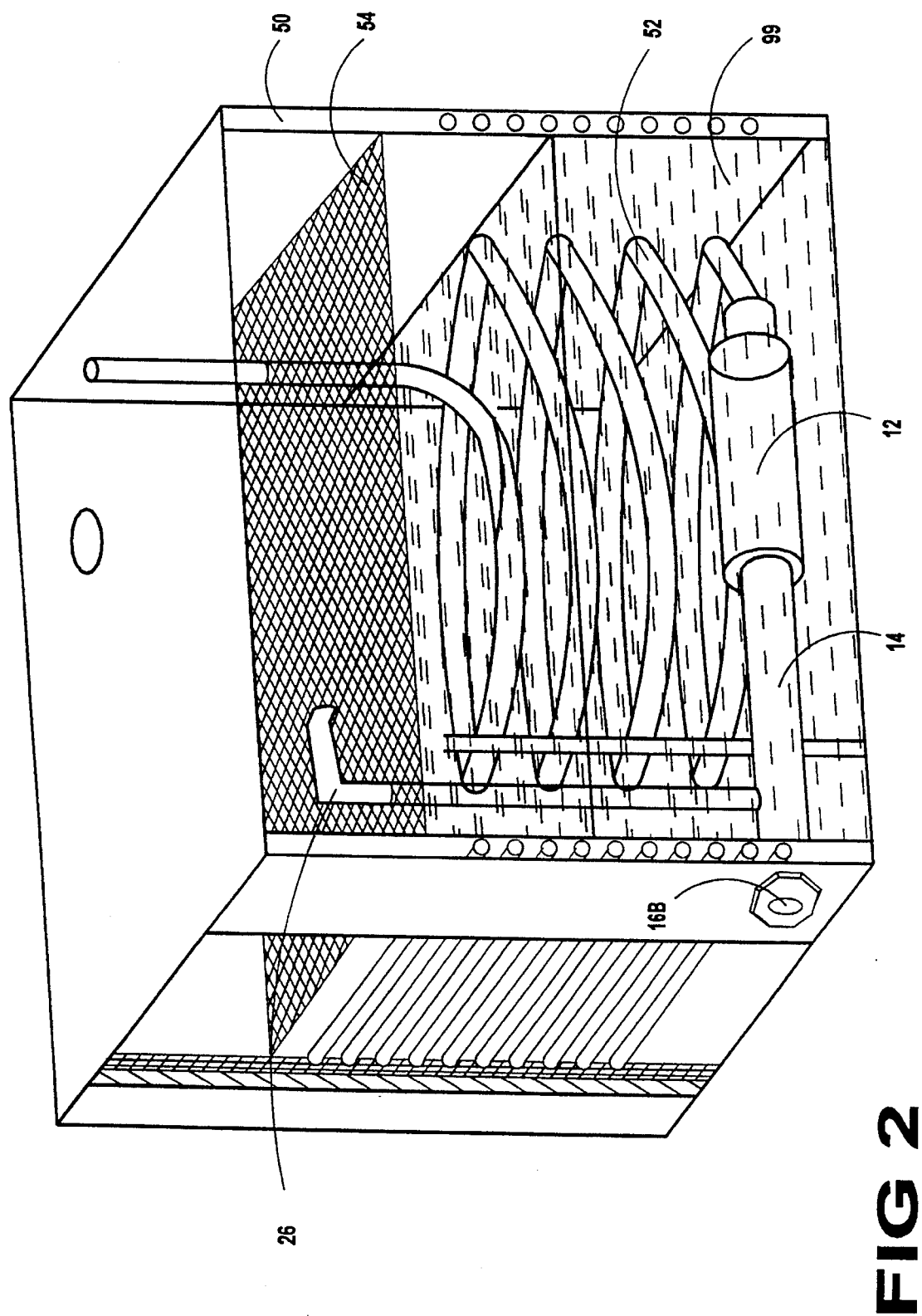
FIG. 2 is an perspective view of the device of FIG. 1 disposed within water tank.
Figure 3:
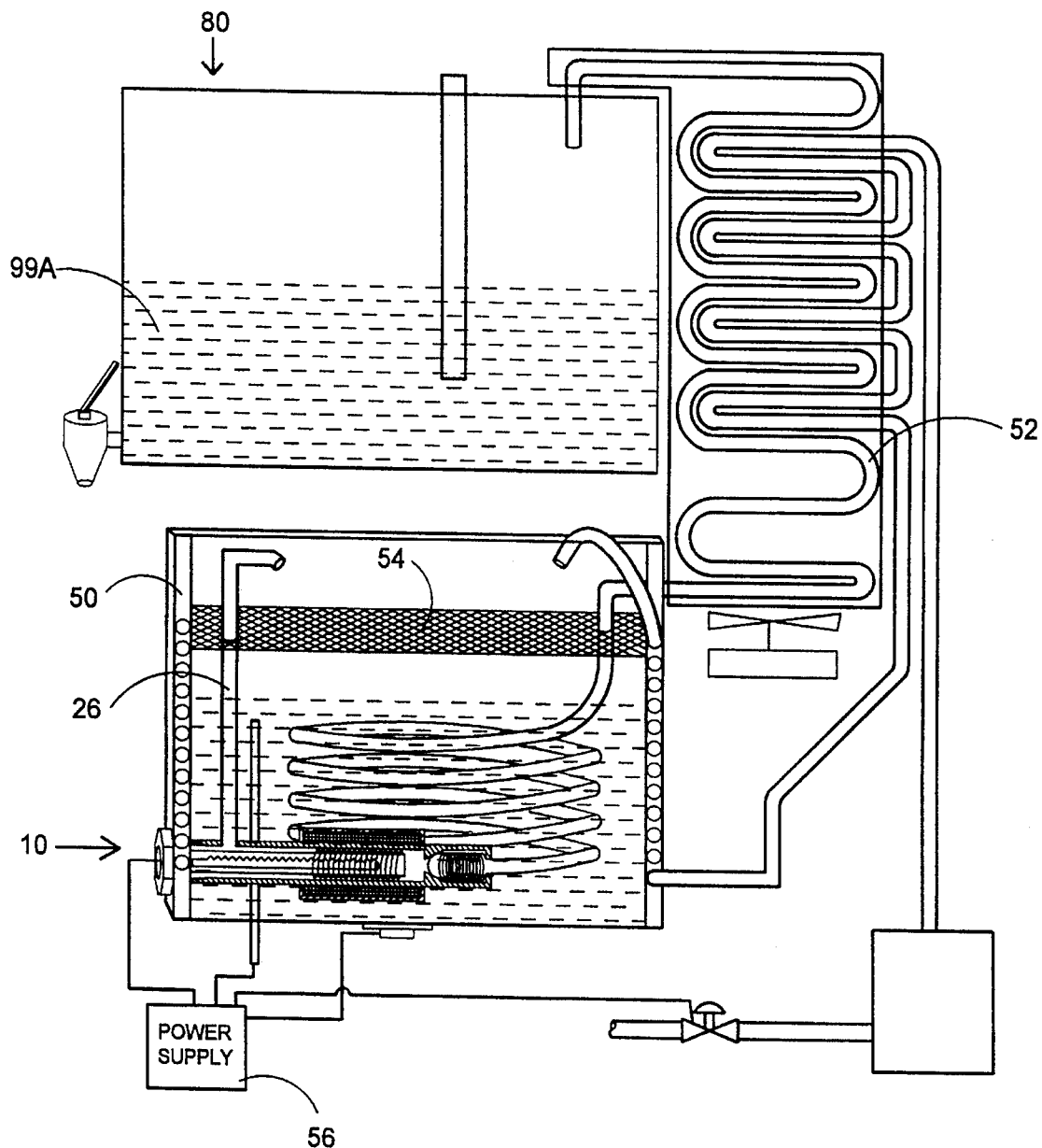
FIG. 3 is a perspective view of the device of FIGS. 1—2 incorporated as part of a water purification system.

Secondly, referring to FIGS. 2–3 which illustrate the heating device 10 as incorporated with an exemplary water purification system 80, and further illustrating 50 tank 50 containing a volume of feedstock water 99 therein; a superheated steam conduit 52 in communication with the outlet port 14C to direct the superheated steam to an external condenser assembly; a baffle plate 54 disposed within the tank 50 above the water 90, functioning to provide a surface in which suspended water droplets and contaminants can be screened from the steam; and a power supply 56 in electrical communication with the heating device 10 and the thermocouple 18. The water purification system 80 adapted to heat the contaminated water 99 contained within the water tank 50 to a boil to produce steam, and introduce the steam into the heating device 10 wherein the steam is superheated into vapor. The vapor is then condensed into purified water 99A.

It will be understood that each of the elements described above, or two or more together, may also find a useful application in other types of constructions differing from the type described above.

While the invention has been illustrated and described as embodied in a vaporizing and superheating device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A heating device for submersion within a tank of water to boil the water to produce steam, and for superheating the steam, comprising:

a) an outer sleeve;

b) an inner sleeve partially disposed through the outer sleeve and having a proximal end, and a distal end in the form of an outlet port, the inner sleeve further defining a vapor chamber;

c) a heating element disposed within the vapor chamber and in electrical communication with an external electrical power supply, the heating element adapted to produce heat in response to electrical energy from the power supply;

d) a steam inlet tube extending outwardly from the inner tube and in fluid communication with the vapor chamber;

e) and a one way valve disposed within the vapor chamber adjacent the outlet port, the valve adapted to selectively gate the flow of vapor from within the vapor chamber through the outlet port; and f) wherein the heating device is configured to heat the water within the tank to a boil to produce steam, the steam inlet tube adapted to direct the steam into the vapor chamber wherein the steam is superheated through direct contact with the heating element producing vapor, the vapor generating sufficient pressure to open the valve and exit the heating device through the outlet port.

2. The device as described in claim 1 wherein the outer sleeve has a bore therethrough dimensioned to receive a portion of the inner sleeve therethrough.

3. The device as described in claim 2 wherein the inner sleeve is partially disposed within the outer sleeve and defines the vapor chamber, an internal vapor exiting passage, and the outlet port, the inner sleeve adapted to conduct heat.

4. The device as described in claim 3 wherein the inner sleeve vapor chamber is defined by the inner sleeve and extends from the proximal end of the inner sleeve to the distal end of the inner sleeve.

5. The device as described in claim 4 wherein the inner sleeve vapor exiting passage is formed proximal to the valve and channels vapor into the valve.

6. The device as described in claim 5 wherein the inner sleeve outlet port is formed at the distal end of the inner sleeve and is adapted for coupling to an external superheated steam conduit.

7. The device as described in claim 6 wherein the heating element is disposed within the vapor chamber and is in electrical communication with the external power supply through cables, the heating element having a heating element high temperature portion within the portion of the inner sleeve that is contained with the outer sleeve, the heating element further forming a heating element fitting for connection to the cables, the heating element adapted to produce heat in response to electrical energy from the power supply.

8. The device as described in claim 7 further comprising a thermocouple connected to the heating element high temperature portion and in electrical communication with an external control assembly, functioning to sense the temperature of the heating element high temperature portion.

9. The device as described in claim 8 further comprising insulation disposed between the outer sleeve and the inner sleeve, functioning to insulate the heating device.

10. The device as described in claim 9 further comprising a tension spring attached to the valve and functioning to bias the valve into a closed position wherein vapor is prevented from exiting the vapor chamber.

* * * * *